Dec. 26, 1967 HAJIME YOSHII 3,360,789

DELETING APPARATUS FOR MAGNETICALLY RECORDED DATA

Filed April 16, 1964 2 Sheets-Sheet 1

INVENTOR
HAJIME YOSHII
BY Stuart Lubitz
ATTORNEY

Dec. 26, 1967 HAJIME YOSHII 3,360,789

DELETING APPARATUS FOR MAGNETICALLY RECORDED DATA

Filed April 16, 1964 2 Sheets-Sheet 2

INVENTOR
HAJIME YOSHII
BY Stuart Lubitz
ATTORNEY 3,360,789

DELETING APPARATUS FOR MAGNETICALLY RECORDED DATA

Hajime Yoshii, Morgan Hill, Calif., assignor to Ampex Corporation, Redwood City, Calif., a corporation of California Filed Apr. 16, 1964, Ser. No. 360,287
6 Claims. (Cl. 340—174.1)

ABSTRACT OF THE DISCLOSURE

Apparatus for deleting selected information previously recorded in multiple channels of a magnetic medium by writing a preselected delete code over the information, wherein the channels of information are sensed by read circuits and introduced to a logic circuit, which in turn determines if the information is to be deleted. A delete command is provided to allow a delete code generator to record the preselected delete code over all channels of the information. After an interval sufficient to allow the write transients to decay, the lagging edges of the recorded delete code are sensed to varify the delete process.

Figure 1:
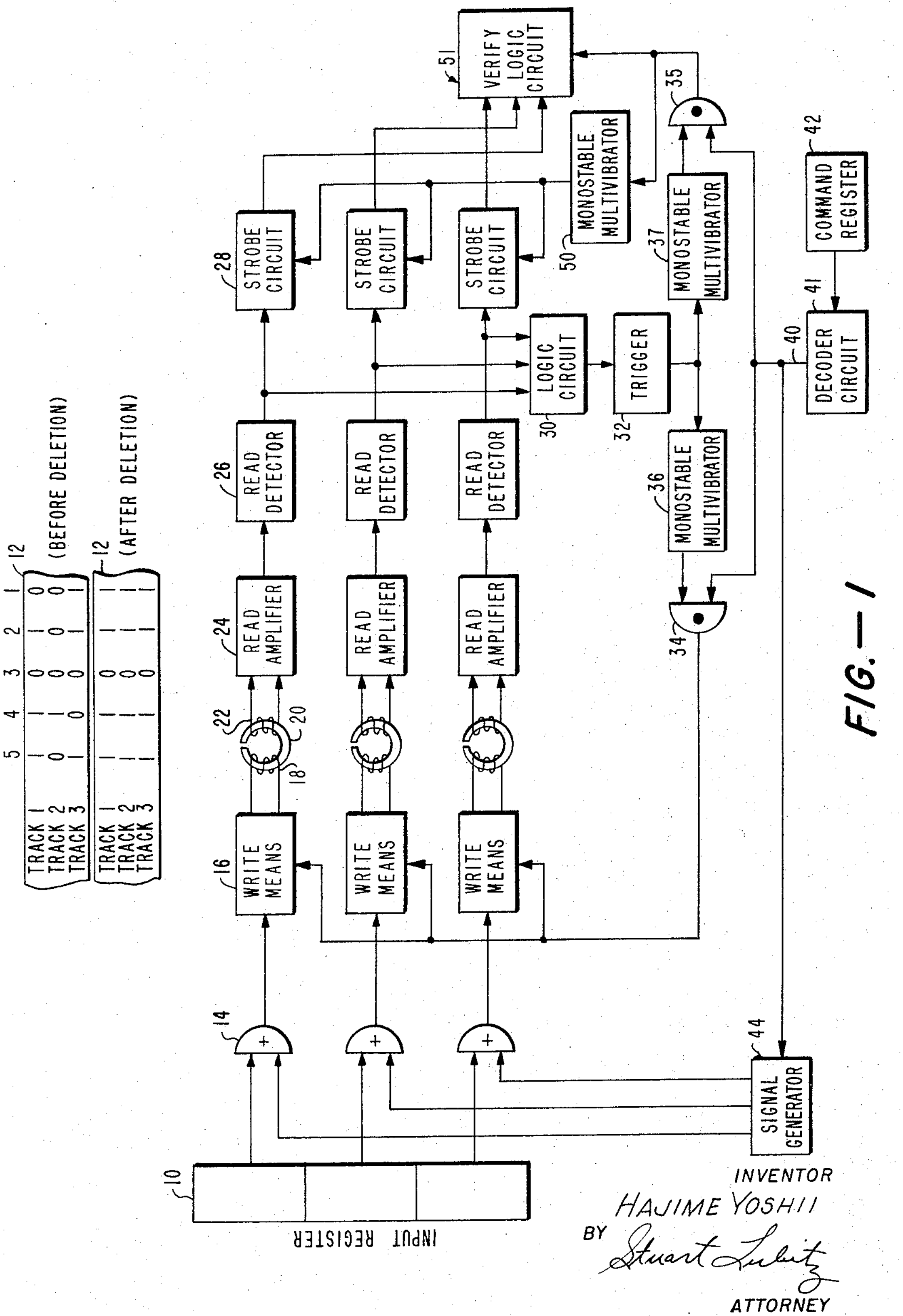

Moving magnetic medium recording systems are used to store great amounts of data. Data records are usually stored sequentially according to some predetermined rules. For example, a file of records comprised of employees' names and other pertinent data can be stored in an alphabetic sequence. In the processing of such files, it is often desirable to be able to delete particular records. For example, if the file is used for payroll computation, it would be unnecessarily time consuming to have to go through the motions of calculating total wages, withholding, state taxes, etc. each week for employees who have terminated. On the other hand, it would also be wasteful to prepare a new file each time a single employee terminated. Rather, it would be preferable to provide some means for simply tagging those records to be disregarded in the processing of the file.

Thus, it is an object of the present invention to provide a method and apparatus adapted to be used in a magnetic recording system for effectively deleting selected data from movable magnetic mediums.

Oftentimes, the lengths of different records in the same file can differ considerably and thus where it is desired to delete a complete record, but no portions of preceding and succeeding records, it is advantageous to be able to sense the recorded data prior to deleting in order to preserve certain recorded information as for example, inter-record gaps, clocking (time synchronizing) information, etc.

It is accordingly a further object of the present invention to provide a method and apparatus for sensing each code recorded on a magnetic recording medium prior to deleting that code.

It is a still further object of the present invention to provide a method and apparatus for effectively deleting selected data from a movable magnetic medium which method can be practiced and which apparatus can be provided at a relatively low cost.

U.S. patent application Ser. No. 355,260 filed on Mar. 27, 1964 and assigned to the same assignee as the present application, discloses a magnetic recording system in which information provided by an input register is recorded on a moving magnetic medium, e.g. a magnetic tape, and immediately thereafter read from the medium and compared with the information provided by the input register to verify that the information intended to be recorded is actually recorded. The preferred embodiment of the invention disclosed in the cited patent application makes use of a single magnetic head per recording track. Each magnetic head has both a read and a write winding coupled thereto. Use is made of a return-to-bias (RB) method of recording; i.e. where the flux on the recording medium is initially biased in a first direction and is reversed to e.g. represent binary "1" digits. In order to read information immediately after it is recorded, the system in the cited patent application senses the lagging fringe of each recorded signal.

Briefly, in accordance with one aspect of the present invention, information previously recorded on the magnetic medium is sensed and deleted in a single pass to the recording medium past the read/write head. In order to write information immediately after it is sensed, the presence of the lagging fringe of the recorded signal on appropriate tracks is sensed and applied to a logic circuit which determines whether the code of which the recorded signal forms a part, is to be deleted. If the recorded code is to be deleted, a delete code generator in turn applies a signal to the head write winding which functions to record a delete code in place of the originally recorded code. Subsequently, after an interval which is sufficiently long to allow writing transients caused by the delete code signals applied to the write winding to die down, the lagging edge of the recorded delete code signals can be sensed and verified.

Figure 2:
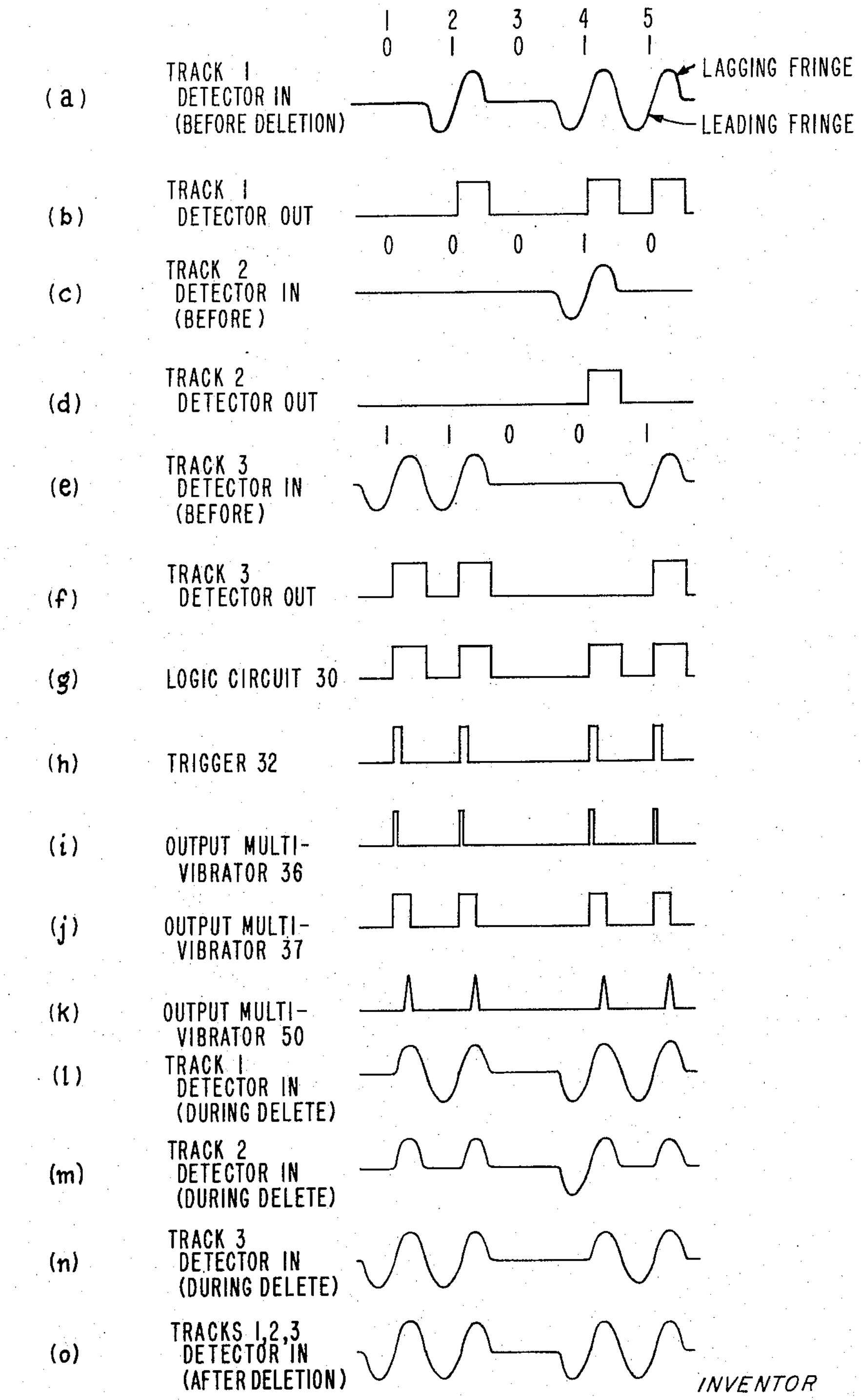

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of a magnetic recording system incorporating the present invention; and FIGURE 2 is a waveform chart illustrating waveforms appearing at various points in the system of FIGURE 1 in response to an arbitrary series of binary digits sensed from a magnetic recording medium.

Attention is now called to FIGURE 1 of the drawings which illustrates, in block diagram form, a preferred embodiment of a magnetic recording system incorporating the present invention. The exemplary system illustrated employs three data channels for recording information on and reading information from three tracks of a movable magnetic medium, as for example magnetic tape 12, but it should be understood that a system employing virtually any number of channels could be constructed incorporating the present invention.

The input register 10 is provided with three stages, each stage having an output terminal connected to the input of a different Or gate 14. The output of each Or gate 14 is connected to the information input terminal of a write means 16 whose output is connected to a write winding 18 coupled to a magnetic head 20. Each of the magnetic heads 20 is positioned adjacent a different one of the three recording tracks defined on the magnetic tape 12.

A read or sense winding 22 is coupled to each head 20 and is connected to the input of a read amplifier 24 whose output is connected to the input of a read detector 26. The output of each of the read detectors 26 is connected to the input of a strobe circuit 28. In addition, the outputs of all of the read detectors 26 are connected to the input of a logic circuit 30 whose output is connected to the input of a trigger circuit 32.

The output of the trigger circuit 32 is connected to the inputs of first and second monostable multivibrators 36 and 37. The outputs of the multivibrators 36 and 37 are respectively connected to the inputs of the And gates 34 and 35.

The second input to each of the And gates 34 and 35 is derived from output terminal 40 of decoder circuit 41 whose input is connected to the output of a command register 42 which can, for purposes herein, store a "delete and verify" command. The decoder circuit output terminal 40 will be made true when the "delete and verify" command is stored. The output terminal 40 is connected to the input of a delete code signal generator 44. The delete code signal generator 44 is provided with a number of output terminals equal to the number of recording channels and each of the output terminals is connected to the input of a different one of the Or gates 14.

The output of And gate 34 is connected to the control input terminal of each of the write means 16. The output of And gate 35 is connected to the input of monostable multivibrator 50 whose output is connected to the control input terminal of each of the strobe circuits 28. The output of each of the strobe circuits 28 is connected to the input of the verify logic circuit 51. The output of gate 35 is additionally connected to the control terminal of the verify logic circuit 51.

Prior to considering the detailed operation of the system of FIGURE 1 and making reference to the waveforms of FIGURE 2, the general characteristics of the write and verify operation, disclosed in detail in the aforecited U.S. patent application, will be initially discussed. Initially, the write means 16 are enabled by a monostable multivibrator and And gate (not shown but corresponding to 36 and 34) to initiate currents in the write windings 18, dependent upon the states of the corresponding stages of the input register 10. Utilizing the preferred return-to-bias (RB) method of recording, the flux on the magnetic tape 12 can be initially biased in a first direction. Current is initiated in the write windings 18 only when a binary "1" digit is to be recorded. Thus, only those stages of the input register 10 storing a binary "1" digit will provide a signal to the corresponding write means to in turn cause the initiation of current in the write winding connected thereto. As disclosed in the aforecited U.S. patent application, immediately after a write current is initiated in the write winding, movement of the tape 12 relative to the head 20 will induce signals in the read winding 22 which are indicative of the digit actually recorded. The signals induced in the read windings 22 will be coupled through the read amplifier, detector, and strobe circuit to the verify logic circuit 51 which compares the signals read off the tape with the signals provided by the input register 10. The strobe circuits 28 will be enabled after the delay introduced by a multivibrator (not shown) which delay serves to assure that all writing transients have died down before the recorded signals are amplified, detected, strobed, and then applied to the logic circuit 51.

With an understanding of the "write and verify" operation, explained in greater detail in the aforecited patent application, in mind, the delete and verify operation should be readily understood. In response to a delete and verify command being entered into the register 42, the decoder output terminal 40 will be made true. Movement of the tape 12 past the heads 20 cause signals indicative of the digits previously recorded on the tape to be induced in the windings 22 and applied through the read amplifiers and read detectors to the input of the logic circuit 30. The logic circuit 30 determines whether the information being read is to be deleted. That is, in deleting selected records from a magnetic tape, it is sometimes desirable to not delete particular codes, such as inter-record gap codes, and thus, it is desirable that each of the codes be sensed prior to writing a delete code thereover. Thus, let it be arbitrarily assumed that the code 000 represents an inter-record gap code and that the code 111 represents a delete code. Let it be further assumed that any other code is merely a data code. Thus, the logic circuit can comprise an Or gate which is responsive to the representation of a "1" digit on any one of its input lines for providing a true output signal. A true output signal provided by the logic circuit 30 will cause the trigger circuit 32 to apply a pulse to multivibrators 36 and 37 to switch them to their unstable states. Consequently gate 34 will be enabled which will thereby cause the write means 16 to write the delete code provided by the signal generator 44 through gates 14, on the tape 12. The utilization of the RB method of recording and the choice of an all "1's" code as the delete code, inherently permits the signals provided by the generator 44 to override any signals applied by the input register 10 to the gates 14. Therefore, whenever anything but an all "0's" code is sensed by the heads 20, and when a delete and verify command is stored in the command register 42, an all "1's" code will be written over the sensed code while the tape 12 is being moved past the heads 20.

The strobe circuits 28 are enabled after the delays introduced by multivibrators 37 and 50, which delays allow time for any writing transients to die before the recorded information is verified. The multivibrator 37 provides the longer delay necessary and the multivibrator 50 provides a very short strobe circuit enable signal. Thus, any signals induced in the read windings 22 during this delay are not coupled to the verify logic circuit 51. After the writing transients have died, the signals induced in the read windings 22 will of course be strobed and applied to the verify logic circuit 51. If the output terminal 40 of the decoder circuit 41 is true, the verify logic circuit 51 will compare the code sensed from the magnetic tape with delete code signal manifestations derived from the generator 44. The signal generator 44 is coupled to the verify logic 51 (not shown).

Attention is now called to FIGURE 2 which illustrates waveforms of signals appearing at various points in the system of FIGURE 1 in the process of deleting previously written codes read from the tape 12. In FIGURE 1, the representation of the tape 12 illustrates the five arbitrarily chosen codes shown in FIGURE 2 after they have been subjected to the deletion process. It will be noted, that each of the codes except the all "0's" code, has been replaced by a delete code. Note the waveform of the series of previously written digits read from the tape tracks and represented in lines *a*, *c*, and *e* of FIGURE 2. In response to the waveforms presented in lines *a*, *c*, and *e*, which are available at the output of the read amplifiers 24, the read detectors 26 provide the output waveforms represented in lines *b*, *d*, and *f* of FIGURE 2. Assuming that the logic circuit 30 is an Or gate, the waveform in line *g* represents the output thereof which it will be noted, causes the trigger circuit 32 to define the output waveform illustrated in line *h*. The trigger pulses in line *h* each cause the multivibrators 36 and 37 to switch to their unstable states. In response to the generation of each trigger pulse, current is initiated in each of the write windings 18 to write a "1" digit on each of the tape tracks if, and only if the delete and verify command is entered into register 42, causing delete code generator 44 to apply "1's" on each track and to cause write means 16 to write as a result of And gate 34 being enabled. As can be seen, the output waveform of the multivibrator 37 only enables the strobe circuit after the completion of the period in which writing transients may appear. The writing transients are illustrated in lines *l*, *m*, and *n* of FIGURE 2, which illustrates the waveforms of the signals applied to the inputs of the read detectors. Line *o* illustrates deleted data when read back at a later time.

If the delete and verify command is not stored in the register 42, the And gate 34 inhibits the output of multivibrator 36 thus, of course, preventing the delete code from being written.

From the foregoing, it should be appreciated that a system for selectively deleting data from a moving magnetic recording medium while continuously sensing (and verifying) such data has been disclosed. Although the logic circuit 30 has been assumed to be merely an Or gate so that each and every data code is deleted when a delete command is in the command register, it is recognized that the logic circuit 30 can be made responsive to any desired code so that codes other than gap codes can be retained on the tape after the deleting process is performed. The embodiment of the invention disclosed herein provides means for both sensing information stored on a magnetic recording medium and for deleting the sensed information if it matches certain criteria in a single pass of the medium past a read/write station. This has been done by sensing the lagging fringe of the recorded signal. It is pointed out that if both leading and lagging fringes are sensed, the recorded information can be read into some output register prior to deletion. Scant attention has been paid herein to the speed at which the tape is driven because this factor only affects the amount of delay required to be introduced by multivibrator 37. Aside from the difference in delay, the system operation will be the same whether the tape is moved incrementally or driven at some constant velocity.

What is claimed is:

1. In a magnetic recording system including a movable magnetic medium having a series of codes recorded therein each code being comprised of a plurality of digits each of which is either a first or a second binary digit, each digit of a code being recorded in a different one of a plurality of tracks defined in said medium, and including a plurality of magnetic heads each positioned adjacent to a different one of said tracks, each head having a read winding and a write winding coupled thereto, and means for moving said medium past said heads to thereby selectively develop a signal in the read windings representative of respective (a) first digits recorded in respective tracks adjacent thereto, the combination comprising; logic means connected to said read windings and responsive only to a code containing at least one first binary digit for providing an output signal; a signal code generator connected to said write windings and responsive to said logic means output signal for applying a predetermined set of signals to the plurality of write windings for recording a predetermined code in all tracks of said medium prior to the development of signals in each of said read windings representative of the digit succeeding said first digit; command means coupled to said logic means and to said signal code generator for selectively generating a delete command; and verify means coupled to said plurality of read windings and responsive to said logic means and to said command means for verifying that said predetermined code has been successfully recorded in all tracks, wherein the read, delete and verify processes are performed in a single pass of the medium by the magnetic heads.

2. The system of claim 1 including means responsive to the provision of said logic means output signal for preventing said verify means from responding to the signals developed in said read windings after the delete process for a predetermined interval after the predetermined code has been written.

3. The system of claim 2 wherein said plurality of read windings are adapted to sense the leading edge of the lagging fringe of the prerecorded series of codes in the magnetic medium prior to the delete process, and to sense the lagging edge of the lagging fringe of the predetermined code recorded in the plurality of tracks after the delete process.

4. The system of claim 2 wherein said logic means includes a logic circuit, and a pulse forming means coupled to said logic circuit for generating a relatively short pulse for enabling the application of said predetermined set of signals to the plurality of write windings in response to said command means.

5. The system of claim 2 wherein said verify means includes variable-duration pulse forming means coupled to said logic means and to said command means, strobe means coupled to said variable-duration pulse forming means and to each of the read windings to allow individually sampling the output of the read windings, and a verify circuit coupled to the strobe means and responsive to the variable-duration pulse forming means for verifying that said predetermined code has been successfully recorded in all tracks.

6. The system of claim 5 wherein said variable-duration pulse forming means includes a first multivibrator coupled to said logic means for generating a relatively long pulse having a length proportional to the speed of the magnetic medium past the magnetic heads, and a second multivibrator coupled to said first multivibrator and responsive to said command means for introducing a relatively short pulse to said strobe means upon termination of the relatively long pulse from said first multivibrator.

References Cited

UNITED STATES PATENTS 3,243,789 3/1966 Ragle ------------ 340—174.1

BERNARD KONICK, *Primary Examiner.*

A. I. NEUSTADT, *Assistant Examiner.*